(12) United States Patent
Martin et al.

(10) Patent No.: US 6,658,522 B1
(45) Date of Patent: Dec. 2, 2003

(54) METHOD TO REDUCE OVERHEAD ASSOCIATED WITH SYSTEM I/O IN A MULTIPROCESSOR COMPUTER SYSTEM

(75) Inventors: Brian James Martin, Worcester, MA (US); Peter John McCann, Mason, NH (US)

(73) Assignee: EMC Corporation, Hopkinton, MA (US)

( * ) Notice: Subject to any disclaimer, the term of this patent is extended or adjusted under 35 U.S.C. 154(b) by 483 days.

(21) Appl. No.: 09/596,295

(22) Filed: Jun. 16, 2000

(51) Int. Cl.[7] .............................................. G06F 12/00
(52) U.S. Cl. ............................ 711/1; 711/6; 711/163; 711/203; 711/206; 709/1; 709/103; 710/6
(58) Field of Search .................................. 711/1, 163, 6, 711/203, 206, 209; 709/1, 103; 710/2, 3, 6

(56) References Cited

U.S. PATENT DOCUMENTS

| 5,615,374 | A | * | 3/1997 | Sadoi et al. ................. 710/200 |
| 5,761,659 | A | * | 6/1998 | Bertoni ........................... 707/8 |
| 5,887,146 | A |   | 3/1999 | Baxter et al. |
| 5,956,712 | A | * | 9/1999 | Bennett et al. ................. 707/8 |
| 5,983,310 | A | * | 11/1999 | Adams ........................... 711/6 |
| 5,983,329 | A | * | 11/1999 | Thaler et al. ................ 711/163 |
| 6,347,364 | B1 | * | 2/2002 | Liedtke ....................... 711/163 |

* cited by examiner

*Primary Examiner*—Donald Sparks
*Assistant Examiner*—Ngoc Dinh
(74) *Attorney, Agent, or Firm*—William J. Daley, Jr.; Edwards & Angell, LLP (57) ABSTRACT

Featured is a method for reducing overhead associated with system input output (I/O) operations in a computer system having a plurality of processors and a physical memory accessed and used by the plurality of processors. The physical memory being accessed can be a global physical memory such as that used with SMP types of architectures or distributed physical memory such as that used with CCNUMA types of architectures. Such a method includes creating a pinned virtual memory range database in which is stored virtual memory address information corresponding to pinned physical memory for each applications program being run on the computer system. Also featured is an operating system for execution with a multiprocessor computer system and a multiprocessor computer including such an operating system for execution therein.

27 Claims, 7 Drawing Sheets

METHOD TO REDUCE OVERHEAD ASSOCIATED WITH SYSTEM I/O IN A MULTIPROCESSOR COMPUTER SYSTEM

FIELD OF INVENTION

The present invention relates to operating systems for multi-processor computer systems and more particularly to a system and method for an input/output (I/O) operation of a multi-processor computer system, more specifically a system and method for an I/O operation in which a system wide global PFD lock is not a requisite to performing the I/O operation.

BACKGROUND OF THE INVENTION

Many current computer systems employ a multi-processor configuration that includes two or more processing units interconnected by a bus system and each being capable of independent or cooperative operation. Such a multi-processor configuration increases the total system processing capability and allows the concurrent execution of multiple related or separate tasks by assigning each task to one or more processors. Such systems also typically include a plurality of mass storage units, such as disk drive devices to provide adequate storage capacity for the number of task executing on the systems.

One type of multi-processor computer system embodies a symmetric multiprocessing (SMP) computer architecture which is well known in the art as overcoming the limitations of single or uni-processors in terms of processing speed and transaction throughput, among other things. Typical, commercially available SMP systems are generally "shared memory" systems, characterized in that multiple processors on a bus, or a plurality of busses, share a single global memory or shared memory. In shared memory multiprocessors, all memory is uniformly accessible to each processor, which simplifies the task of dynamic load distribution. Processing of complex tasks can be distributed among various processors in the multiprocessor system while data used in the processing is substantially equally available to each of the processors undertaking any portion of the complex task. Similarly, programmers writing code for typical shared memory SMP systems do not need to be concerned with issues of data partitioning, as each of the processors has access to and shares the same, consistent global memory.

Figure 3:
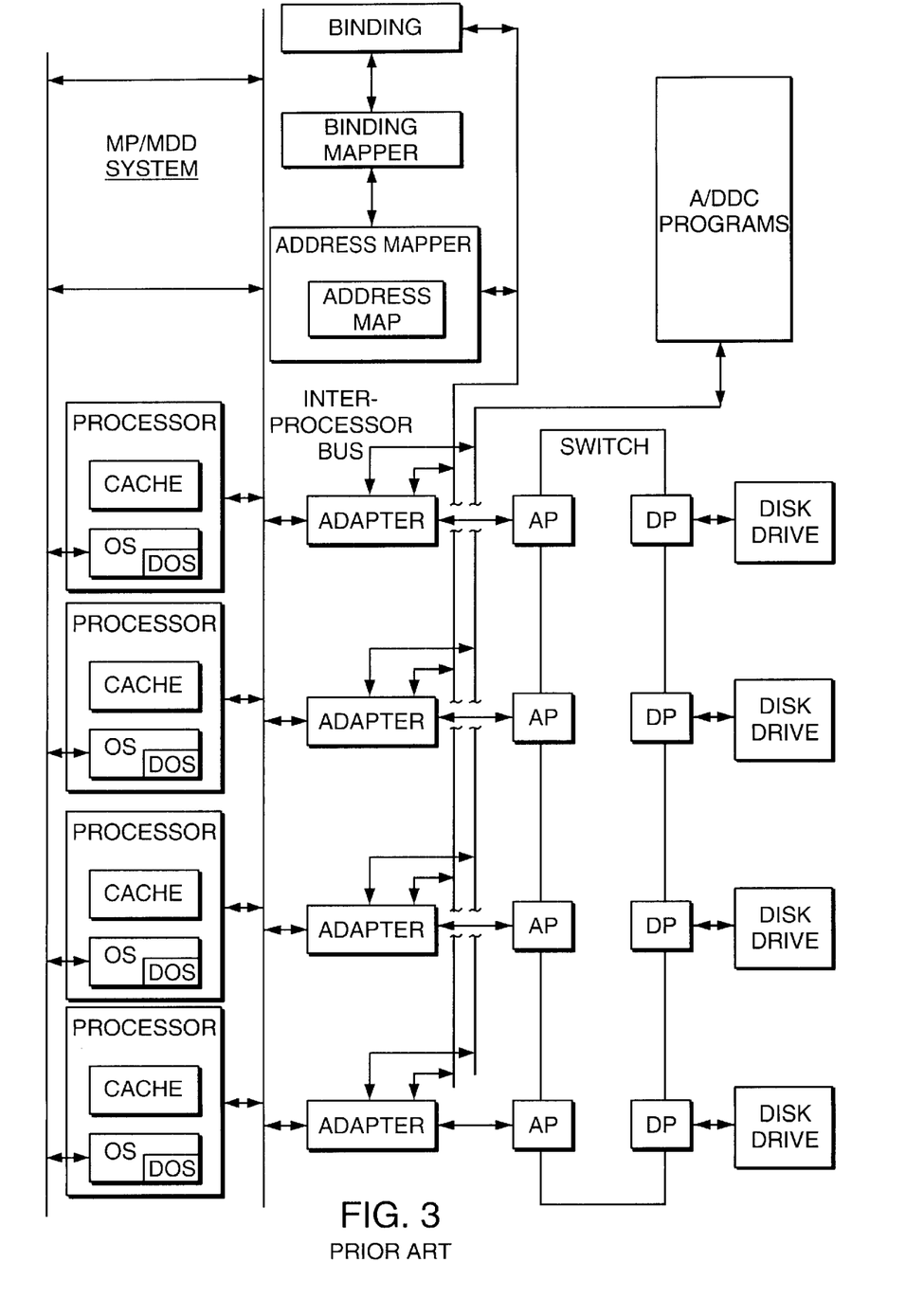
FIG. 3 is a block diagram of an exemplary multiprocessor system that implements a SMP architecture.

There is shown in FIG. 3 a block diagram of an exemplary multiprocessor system that implements a SMP architecture. For further details regarding this system, reference shall be made to U.S. Ser. No. 09/309,012, filed Sep. 3, 1999, the teachings of which are incorporated herein by reference.

Another computer architecture known in the art for use in a multi-processor environment is the Non-Uniform Memory Access (NUMA) architecture or the Cache Coherent Non-Uniform Memory Access (CCNUMA) architecture, which are known in the art as being an extension of SMP but which supplants SMPs "shared memory architecture." NUMA and CCNUMA architectures are typically characterized as having distributed global memory. Generally, NUMA/CCNUMA machines consist of a number of processing nodes connected through a high bandwidth, low latency interconnection network. The processing nodes are each comprised of one or more high-performance processors, -associated cache, and a portion of a global shared memory. Each node or group of processors has near and far memory, near memory being resident on the same physical circuit board, directly accessible to the node's processors through a local bus, and far memory being resident on other nodes and being accessible over a main system interconnect or backbone. Cache coherence, i.e. the consistency and integrity of shared data stored in multiple caches, is typically maintained by a directory-based, write-invalidate cache coherency protocol, as known in the art. To determine the status of caches, each processing node typically has a directory memory corresponding to its respective portion of the shared physical memory. For each line or discrete addressable block of memory, the directory memory stores an indication of remote nodes that are caching that same line.

Figure 4:
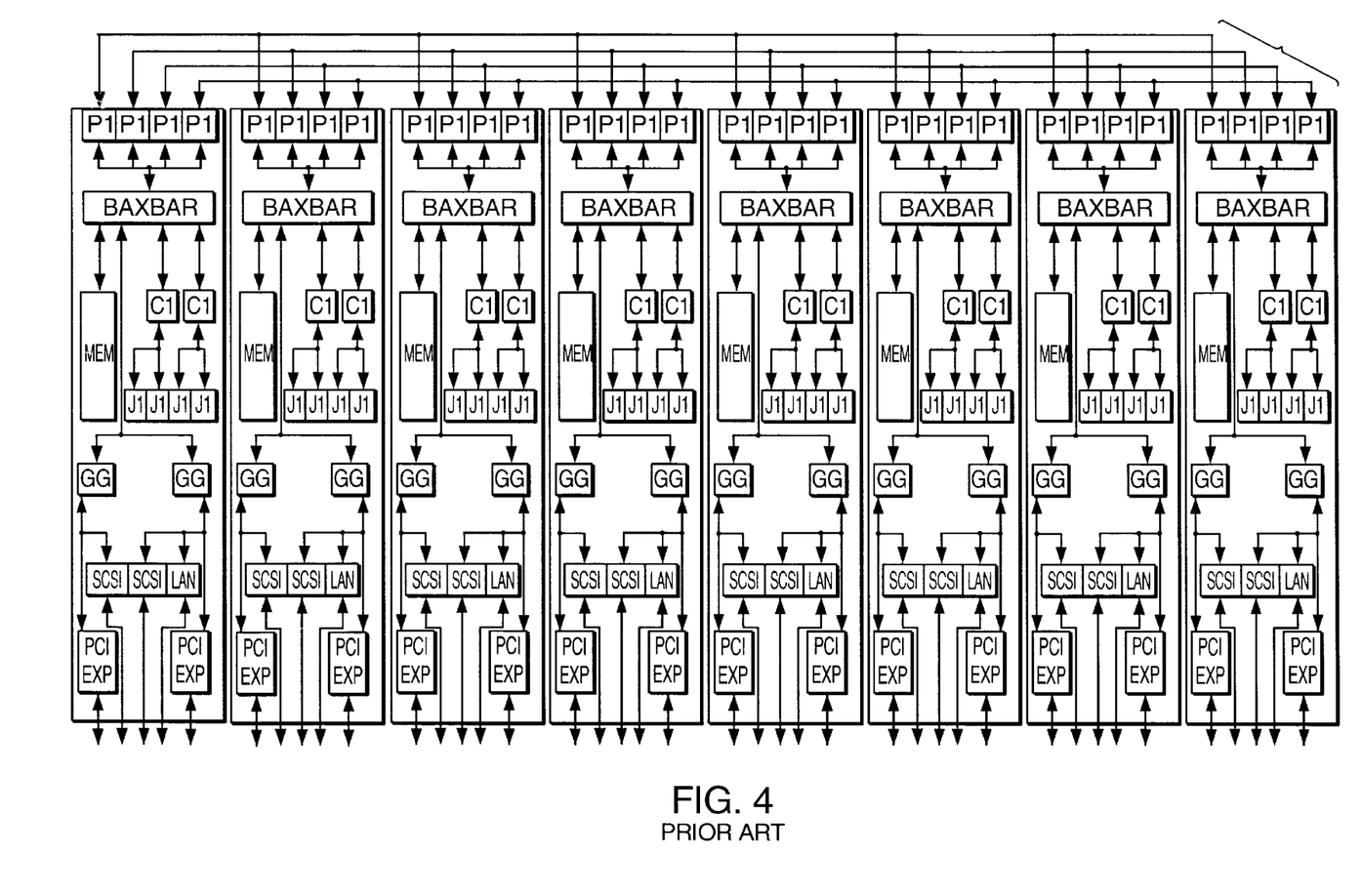
FIG. 4 is a high level block diagram of another exemplary multiprocessor system that implements a CCNUMA architecture.

There is shown in FIG. 4 a high level block diagram of another exemplary multiprocessor system but which implements a CCNUMA architecture. For further details regarding this system, reference shall be made to U.S. Pat. No. 5,887,146, the teachings of which are incorporated herein by reference.

Almost all modern computer systems, including multi-processor system employing the above-described computer architectures, use Virtual Memory, in which addressable ranges of computer memory may or may not be present in, or connected to, equivalent physical memory at any given time. It is the responsibility of the operating system, or computer hardware, to ensure that the Virtual Memory be mapped, or connected, to corresponding physical memory when the Virtual Memory is being accessed by either an executing processor or other device (usually an I/O device). Virtual Memory that is not currently being accessed is free to be "unmapped", or disconnected from its corresponding physical memory. The contents of the Virtual Memory that is unmapped or disconnected are generally maintained in a so-called "backing store" (usually a disk drive).

Because of the asynchronous nature of I/O operations, it is vitally important that the Virtual Memory involved with the I/O operation is not unmapped in the time between the initiation of an I/O operation (such as a read, or input, from a disk device), and the completion of the same I/O operation (such as the actual storing into memory of the retrieved disk device data). Thus, it is necessary for Virtual Memory pages involved in an I/O operation, to be "locked", "wired", or "pinned", to their corresponding physical memory during the entire time that data is moving between the physical memory and the I/O device. In this way, the pinned pages of physical memory cannot be unmapped during the I/O operation.

There are two techniques that have been implemented for ensuring the proper mapping of virtual memory to physical memory for I/O operations. The first and simplest method, and the technique generally being implemented, in general terms involves individually querying the status of each and every physical memory page participating in the I/O operation, ensuring it is "paged in", "marked as locked", "pinned", or "wired", processing the I/O operation, individually unlocking each physical memory page, and exiting the I/O operation. This solution is expensive and inefficient in that it typically requires the operating system to obtain exclusive access to the physical memory control structures through a broad-based system lock, such as a spinlock.

Figure 1A:
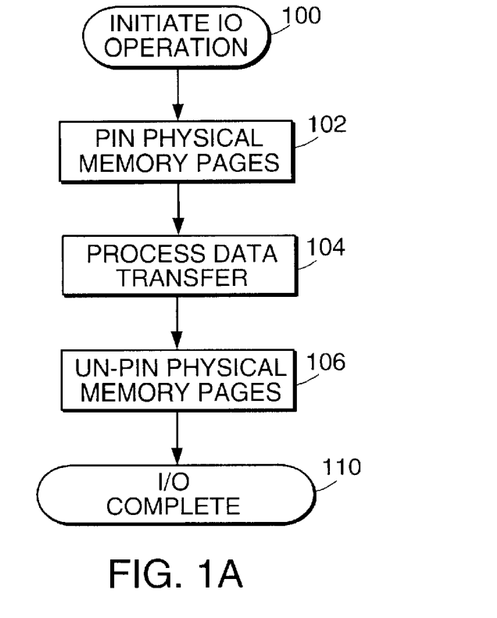
FIG. 1A is a flow diagram of a high level process for a conventional input/output operation of a multi-processor computer system.

More specifically, there is shown in FIG. 1A a flow diagram of the high level process for implementing an I/O operation according to the first technique in a computer system employing two or more processors, where the physical memory can be a shared global memory as with SMP architectures or a distributed global memory as with NUMA/CCNUMA architectures. In accordance with this technique, when a program or process running on one or more processors requires information, for example, to be read to the physical memory from a storage device, written to a storage device from the physical memory or outputted from the physical memory to a communications device or network, an I/O request is made by the processor to the operating system. Pursuant to this request, the operating system initiates an I/O operation, Step 100. As discussed hereinafter, the initiation of the I/O operation can be delayed because of other ongoing activities.

Once the I/O operation is initiated, the operating system proceeds to ensure that the physical memory pages are pinned, STEP 102. As is known in the art, physical memory is typically subdivided into pages, these pages can be mapped or pinned individually so as to correspond to pages or addresses of the Virtual Memory for a given application. This pinning process ensures that the page frame database (PFD) for the physical memory is arranged so as to lock each page of physical memory corresponding to the virtual memory pages or addresses to be read/inputted to or written/outputted from. The PFD covers or describes all of the physical memory of a given machine or computer system regardless of where it is in the machine (e.g., centralized global memory or distributed memory as with CCNUMA architectures). Once a page of physical memory is marked as locked or pinned in the PFD, the operating system cannot re-map the physical memory page(s) as a Virtual Memory page for another application until that I/O operation in process is completed, and the physical memory page is marked as unpinned or unlocked.

Figure 1B:
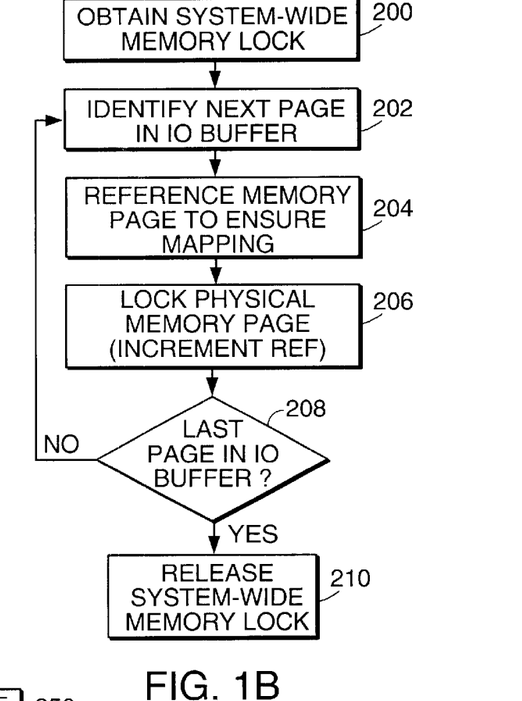
FIG. 1B is a flow diagram illustrating a conventional process for the pinning of physical memory pages.

Now referring also to FIG. 1B, there is shown a process for the "pinning " of the physical memory pages under Step 102. The pinning process is initiated by having the operating system first obtain a system-wide global PFD lock, STEP 200. This system wide lock locks the PFD so the mapping or re-mapping of physical memory pages as addresses or pages of Virtual Memory cannot be done for any other application other than the one involved with I/O operation while the PFD is being modified. If there are many I/O operations being initiated simultaneously, acquisition of the PFD lock becomes costly in terms of wasted CPU cycles due to typical bus and cache contention associated with global system locks, typically spinlocks. Consequently, any processes or programs attempting to initiate I/O operations will be pended and delayed until the existing I/O operation releases the system wide global PFD lock.

After locking the PFD, the next page (Virtual Memory page) in the IO buffer is identified, Step 202. When the process is initiated the next page is the first page in the IO buffer. After identifying the next page, the operating system references the page of Virtual Memory so as to ensure mapping, Step 204. This process step also generally includes initiating a process, if needed, to bring the page contents in from backing store. This retrieval of data or information (i.e., virtual memory page contents) from the backing store makes the existing I/O operation overall a time intensive operation because two I/O operations, including two pinning operations, are in effect required. One I/O operation is required to retrieve the page contents from the backing store and the other operation is the I/O operation that had been requested and initiated by the program or process.

After ensuring the mapping between the virtual memory pages and physical memory pages, the operating system updates the PFD so as to lock the appropriate physical memory pages, Step 206. This generally means that a reference counter in the PFD, used to indicate the locked or unlocked status of each page, is incremented to indicate that the associated page is locked or pinned so that the contents cannot be swapped or the physical page remapped during the I/O operation. Typically any nonzero reference counter value indicates that the associated page is locked or pinned. After locking the physical memory page, the operating system determines if this is the last page in the IO buffer, Step 208. If it is not the last page (NO, Step 208), then the operating system identifies the next page in the IO buffer, step 202 and repeats the above-described process, steps 202–208.

If this is the last page in the IO buffer (YES, Step 208) then the operating system releases the system wide global PFD lock, Step 210, thereby unlocking the PFD. This is a precursor to the transfer of data or information. At this point the memory mapping or unmapping functions for another I/O operation (i.e., an operation waiting to perform steps 102 or 106) can proceed, while the existing I/O operation proceeds as follows.

Referring back to FIG. 1A, following the unlocking of the PFD and the release of the system wide global PFD lock, the operating system sends the appropriate signals to the appropriate system hardware so the data or information is transferred to/from the pinned physical memory pages, Step 104. In other words the actual I/O operation, namely the requested read/write operation, is performed. For example, the operating system sends the appropriate signals to an adapter of the computer system so that the data is transferred to/from a disk device such as a hard disk, floppy disc or CD. While the I/O operation is being performed, control is returned to the processor involved with the I/O request so that it can do other things.

As is known in the art, after the data/information transfer is complete, the system hardware (e.g., adapter) outputs a signal(s) to the operating system indicating that the transfer process is complete. After receiving this signal(s), the operating system un-pins the physical memory pages, Step 106. The unlocked pages are thus now free to be remapped as required by the operating system.

Figure 1C:
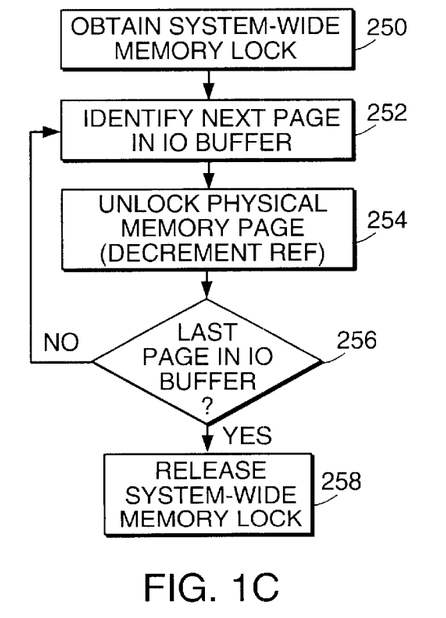
FIG. 1C is a flow diagram illustrating a conventional process for the un-pinning of physical memory pages.

Now referring also to FIG. 1C, there is shown a process for the "un-pinning" of the physical memory pages under Step 106. The un-pinning of the physical memory pages is similar to that described above for the pinning of the physical memory pages, and thus the following is limited to a brief description of the common steps. As such, reference shall be made to the foregoing discussion for Steps 200–202 and Steps 208–210 for further details regarding 250–252 and Steps 256–258 referred to hereinafter.

The un-pinning process is initiated by having the operating system again obtain a system wide global PFD lock, Step 250, to lock the PFD. After locking the PFD, the next page in the IO buffer is identified, Step 252 and after identifying the next page, the operating system updates the PFD so as to un-lock the appropriate physical memory pages, Step 254. This generally means that the locked/unlocked page reference counter in the PFD is decrmented so the reference counter value is zero, so as to indicate that the associated physical memory page is un-locked or un-pinned such that the contents can be swapped or the physical page remapped at a later time.

After un-locking the physical memory page, the operating system determines if this is the last page in the IO buffer, Step 256. If it is not the last page (NO, Step 256) then the operating system identifies the next page in the IO buffer, step 252 and repeats the above-described process for steps 252–256. If this is the last page in the IO buffer (YES, Step 256) then the operating system releases the system wide global PFD lock, Step 258.

Referring now back to FIG. 1A, following the unlocking of the PFD and the release of the system wide global PFD lock, the existing I/O operation is completed, Step 110. At this point the operating system is again available to perform the memory mapping or unmapping functions for another I/O operation (i.e., an operation waiting to perform steps 102 or 106). At the same time control also is returned to the initiator so that the applications program or process involved with the just completed I/O operation can proceed with and/or be available to perform the next task.

Although this particular technique is simple, acquiring the PFD lock for memory mapping, unmapping, and locking becomes increasingly more time consuming as more concurrent I/O operations are initiated and therefore contend for the PFD lock. As also indicated above, while the memory mapping, unmapping, and locking functions of a given I/O operation are being performed other I/O operation requests cannot perform their respective memory mapping, unmapping, and locking functions and thus the applications programs/processors involved with such other I/O operation requests are unable to proceed (i.e., pended or delayed).

If one or more applications programs being run on a multi-processor system require or involve frequent I/O access to disk devices and/or communication devices (e.g., for example a database or transaction processing application), then the I/O requests of the multi-processors can become in competition with each other. As a consequence, the competing I/O operations can cause the processing of one or more I/O operations to be delayed. Consequently, the time to perform a task by an applications program in the standby mode is in effect increased. The second technique is essentially the same as the above-described method and has been thus incorporated into the above.

It thus would be desirable to provide new methods, operating systems and multi-processor computer systems that would allow data/information to be transferred to/from the physical memory without having to employ a system wide global PFD lock and which takes advantage of advances in software programming and the wide availability of inexpensive memory. It would be particularly desirable to provide such methods and operating systems that operate at the processor level, in stead of the system level, to verify mapping of the Virtual Memory and pinning of the physical memory prior to initiating the data/information transfer of an I/O operation. It also would be particularly desirable to provide such methods and operating systems, which simplify the cleaning-up (i.e., un-pinning) process following the completion of a data transfer. Further, it would be desirable to provide such methods and devices that reduce the amount of time to perform an I/O operation in comparison to prior art methods and systems.

DEFINITIONS

The instant invention is most clearly understood with reference to the following definitions:

A computer readable medium shall be understood to mean any article of manufacture that contains data that can be read by a computer or a carrier wave signal carrying data that can be read by a computer. Such computer readable media includes but is not limited to magnetic media, such as a floppy disk, a flexible disk, a hard disk, reel-to-reel tape, cartridge tape, cassette tape or cards; optical media such as CD-ROM and writeable compact disc; magneto-optical media in disc, tape or card form; paper media, such as punched cards and paper tape; or on carrier wave signal received through a network, wireless network or modem, including radio-frequency signals and infrared signals.

SUMMARY OF THE INVENTION

The present invention features methods and applications programs for reducing the overhead associated with system I/O in a computer system employing multiple processors and with either a global physical memory or a distributed physical memory. Such methods and applications programs advantageously reduce the amount of contention between the I/O operations of the various processors, in particular contention for the system wide global PFD lock, so as to improve the effective processing time overall for the applications programs being run on the computer system when at least one of such programs generates with great frequency a significant number of I/O operations.

A method for inputting and outputting data/information, in a computer system having a plurality of processors and a physical memory for use by the plurality of processors, includes creating a pinned virtual memory range database in which is stored virtual memory address information corresponding to pinned physical memory for each applications program being run on the computer system. The method further includes determining, using the pinned virtual memory range database, that the virtual memory address for data/information to be transferred thereto/therefrom corresponds to pinned physical memory; and transferring data/information to/from pinned physical memory, when said determining determines that the virtual memory address corresponds to pinned physical memory.

In more specific embodiments, the method further includes pinning a portion, an arbitrary portion, of the physical memory corresponding to identified virtual memory addresses of each applications program being loaded onto the computer system; and wherein said step of creating includes creating a pinned virtual memory range database that includes these virtual memory addresses. Additionally included in the method are the related steps of un-pinning the pinned physical memory of each applications program when it is being unloaded from the computer system; and removing the virtual address information corresponding to the pinned physical memory being unpinned from the pinned virtual memory range database.

According to one aspect of the present invention said step of determining includes the steps of looking-up an address range of an I/O buffer in the pinned virtual memory range database, determining if the I/O buffer address range corresponds to a virtual memory address range that is pinned physical memory, recording the mapping of the physical memory address range that corresponds to the identified virtual memory address range, and marking the I/O buffer as pre-pinned. In a more specific embodiment, said steps of looking-up, determining if the I/O buffer address range corresponds to a virtual memory address range that is pinned physical memory, recording and marking are performed by each microprocessor responsive to the initiation of an I/O operation by said each microprocessor. Also included are steps of obtaining a local/non-global lock of the pinned virtual memory range database prior to said step of looking-up, and releasing the local lock on the pinned virtual memory range database following said step of marking the I/O buffer.

Although the pinned ranges of physical memory should be generally sufficient to accommodate anticipated needs of a given applications program, it is possible that at a given time there may be a desire to pin additional physical memory to additional virtual memory at the discretion of either the application or operating system. Thus, according to another aspect of the present invention, and when a determination is made that the I/O buffer address range does not corresponds to a virtual memory address range for pinned physical memory, said step of determining further includes: obtaining a system-wide memory lock; (e.g., system-wide global PFD lock) mapping the physical memory address range corresponding to the virtual memory address range that were not pinned; pinning the mapped physical memory; and releasing the system-wide memory lock. In general terms, the physical memory not already pinned when the I/O operation was initiated is what should be pinned in the foregoing process. The method further includes the step of unpinning the pinned physical memory for the virtual memory address range that had not been pinned when the I/O operation was initiated, this step of unpinning being performed upon the completion of the transfer of data/information.

In accordance with yet another aspect of the present invention, the method further includes a pinned virtual memory range database updating mechanism by which the virtual memory data is updated to include the added physical memory and virtual memory addresses that were need to perform a given I/O operation. In a more specific embodiment, this virtual memory updating mechanism includes determining if the pinned virtual memory range database should be updated to include the additional virtual memory addresses that were not pinned when the I/O operation was initiated. This determination process would follow completion of the data/information transfer. If it is determined that the pinned virtual memory range database should be updated, then the database is updated to include the additional virtual memory addresses. If it is determined that the pinned virtual memory range database should not be updated, then the pinned physical memory for the virtual memory address range that had not been pinned when the I/O operation was initiated is unpinned in the manner describe herein. Leaving the pages pinned allows future I/O operations to be conducted in accordance with the methods of the present invention.

Also featured are applications programs and/or operating systems as well as multiprocessor computer systems that embody the above-described methodology. Typically, the program code for such operating systems and applications programs is contained are in some form of a computer readable medium so the program code is capable of being loaded onto a computer system either automatically by the computer system (e.g., when the computer is started or booted up) or by action of a user.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Figure 2A:
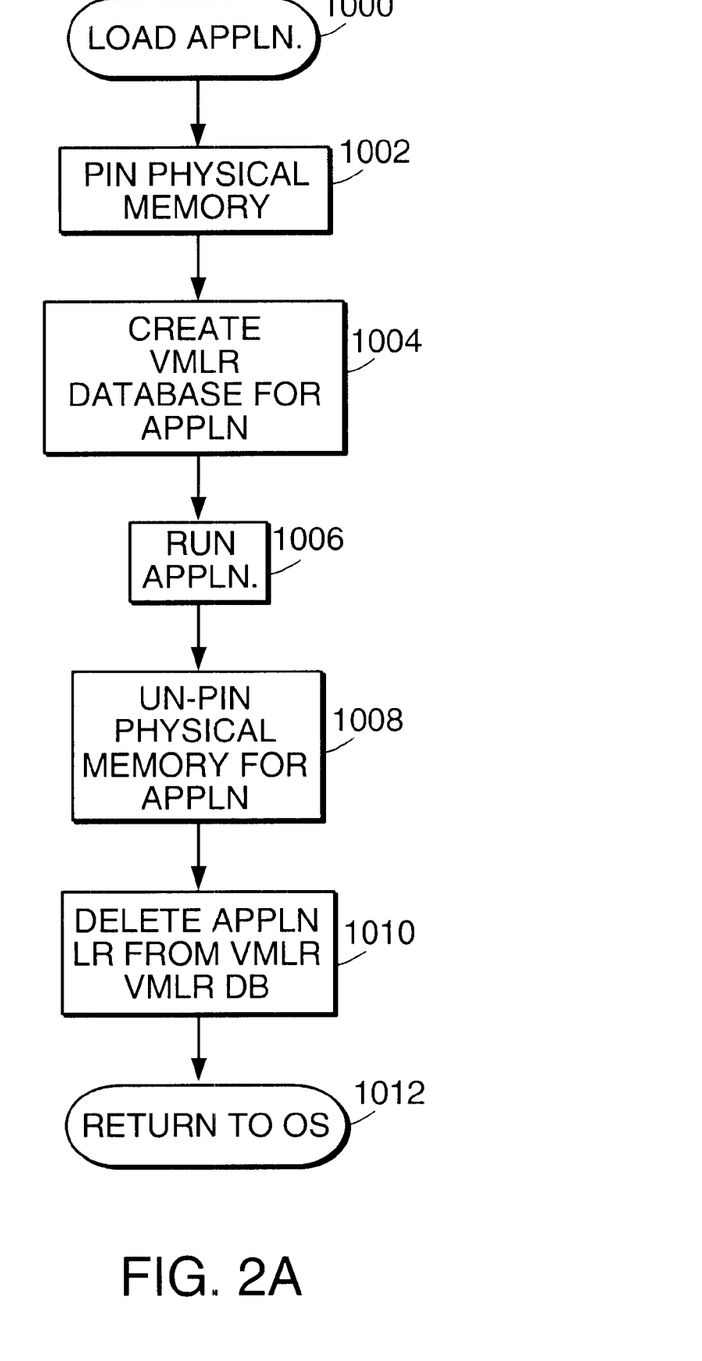
FIG. 2A is a flow diagram of a high level process according to the present invention for an operating system of a multiprocessor computer system involving the loading of an applications program.

Referring now to the various figures of the drawing wherein like reference 1 characters refer to like parts, there is shown in FIG. 2A a flow diagram of a high level process for loading an applications program onto a multiprocessor computer system embodying the methodology of the present invention. As is known in the art, each applications program to be accessed and run on a computer system is loaded into physical memory, Step 1000. Typically, only a portion of the applications program is copied to or loaded into the physical memory and the rest of the applications program remains on the bulk storage device or devices [e.g., hard disk(s)] of the computer system until another portion of the applications program is required to perform a given task. For example, the routine or process used to add pre-defined symbols, such as mathematical symbols or Greek letters, in a word-processing program may reside on the hard disk until the function is elected by the user. After being elected, the routine or process is loaded into the physical memory.

In conjunction with the loading of the required portion(s) of the applications program, the operating system, at either it's direction or the direction of the applications program being loaded, "wires-in", "pages-in", "marks as locked" or "pins" a portion of the physical memory (i.e., pages of the physical memory) that corresponds to at least a portion of the virtual memory for the applications program being loaded, Step 1002. The amount of physical memory being pinned can be any amount from the minimum required for system operation or an amount between the minimum required up to an including an amount sufficient to store the entire applications program in physical memory. Also included is an amount of physical memory sufficient to cover program workspace needs, storage of input data/information required to perform a given task of the program and for any other purposes excluding for example, the executable files of the applications program.

The amounts of physical memory to be pinned is determined in any of a number of manners or ways known to those skilled in the art. For example, the operating system can interrogate the applications program being loaded to determine the desired amounts of physical memory and the related virtual memory addresses required for the program. The operating system also can evaluate the desired amounts to determine if the available physical memory is sufficient to accommodate the desired amount. If it is insufficient, then the operating system can again interrogate the applications program to determine if a lesser amount of physical memory can be pinned for the running of the program. If there is insufficient physical memory, the operating system informs the requesting application. The process for the pinning of the physical memory is as described above in connection with FIG. 1B.

A virtual memory locked range (VMLR) database also is created for the applications physical memory to identify the locked or pinned ranges or addresses of the virtual memory for the loaded applications program, that correspond to pinned physical memory, Step 1004. This VMLR database can be in any of a number of forms known to those skilled in the art that would not involve a system wide lock of the database to perform the functions herein described and so as to be generally consistent with the operational parameters and functions of the herein described methodology of the present invention. For example, the database could be a global database accessible to any of the processors of a multiprocessor system, a distributed database accessible to the corresponding processor or an applications program specific database that can be accessed by the processor(s) running the applications program, or an application specific database divided among arbitrary groups of processors and/or memory regions. As discussed further hereinafter, the VMLR database provides a mechanism by which a determination can be later made that virtual memory pages or addresses associated with an I/O operation of the applications program correspond to pinned physical memory. Although the following generally refers to an application specific database, this shall not constitute a limitation for as indicated above, other forms of databases are contemplated for use with the methodology, processes and systems of the present invention. One technique for creating or updating the VMLR database is otherwise described hereinafter.

Thereafter, the user accesses and runs the applications program to perform the intended tasks and operations, Step 1006. One of these tasks or operations, an I/O operation, is discussed separately and below in conjunction with FIGS. 2B–2D. After the applications program has completed its function(s), the applications program is typically un-loaded from the computer system. Such un-loading in most cases, means that the pinned physical memory pages are released so they are available for use by another applications program running on or to be loaded onto the computer system. As such, following a decision to close out or terminate the running of an applications program, the physical memory corresponding to that applications program is unpinned, Step 1008, and the VMLR database is updated by deleting the locked range data/information for that applications program from the VMLR database, Step 1010. For an application specific database, the database is in effect deleted. The unpinning of the physical memory is accomplished for example in the manner described above for FIG. 1C or below for FIG. 2D and a technique for updating the VMLR database is described hereinafter.

It should be recognized that it is within the scope of the present invention for an operating system to be configured and arranged so as to be capable of selectively implementing different I/O operation methodologies within the multiprocessor computer system. The type of I/O methodology preferably is selected based on the type and number of I/O operations performed by a given process or applications program. For example, the operating system would implement the below described methodology of the present invention using the VMLR database for I/O operations for user level applications expecting high rates of I/O operations (such as database applications or transaction processing applications) and would implement a methodology not involving the use of VMLR database for I/O operations for applications not expecting high rates of I/O operations.

Figure 2B:
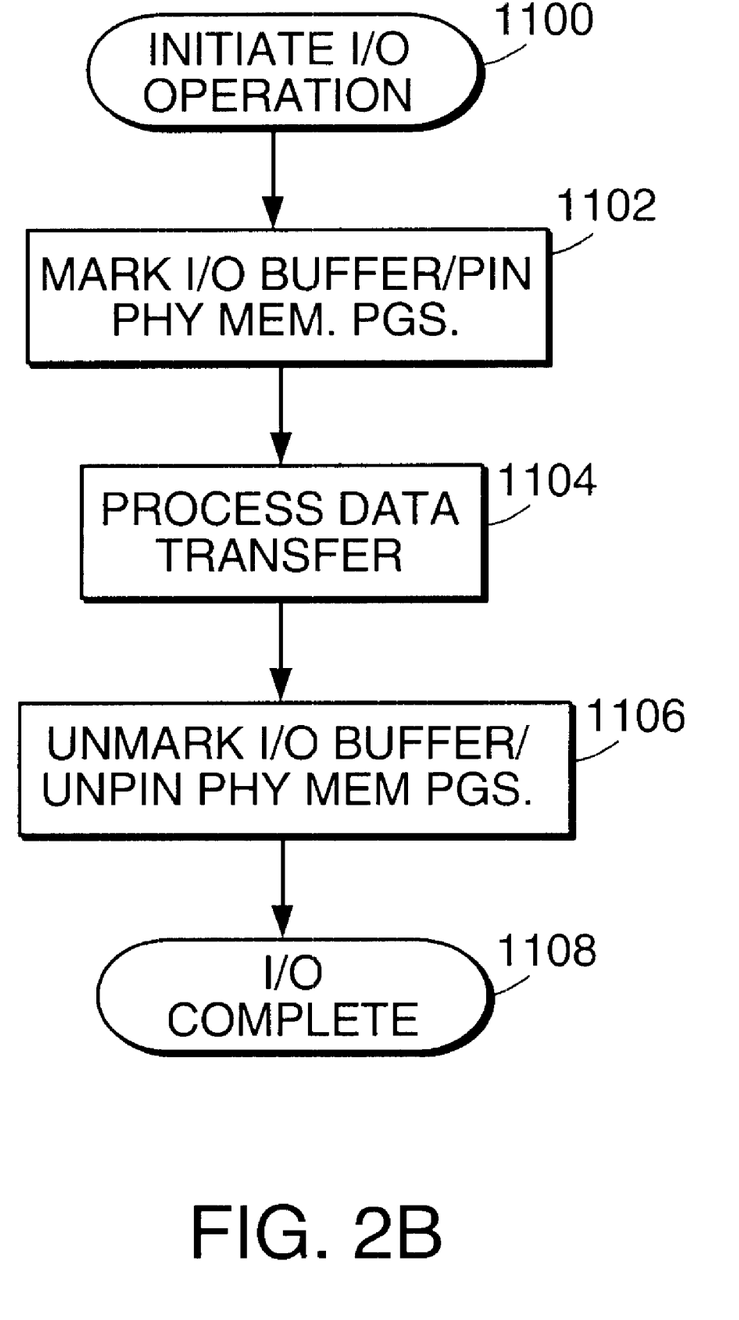
FIG. 2B is a flow diagram of a high level process according to the present invention for an input/output operation of a multi-processor computer system.

Now referring to FIG. 2B, there is shown a high level flow diagram illustrating an input/output operation embodying the methodology of the present invention for execution within a multi-processor computer system. As with all I/O operations, a signal is outputted so as to initiate the I/O operation, Step 1100. Following the initiation of the I/O request, the processor initiating the I/O operation accesses the data/information in the VMLR database or causes the pinning of physical memory, Step 1102. Based on this accessing the processor marks the I/O buffer if the virtual memory addresses involved with the I/O operation correspond to pinned physical memory. If the virtual memory addresses involved with the I/O operation, however, do not all correspond to pinned physical memory pages then the corresponding unpinned physical memory pages are pinned before performing the I/O operation.

As indicated above, the amount of physical memory being pinned when the applications program is loaded is generally sufficient to handle anticipated needs of the running applications program. It is possible, however, that at a given time there may be a desire or need to pin additional physical memory to additional virtual (i.e., physical memory not pinned before the initiation of the I/O operation) memory at the discretion of either the application or operating system. Additionally and as also indicated above, an applications program may be loaded onto the computer system without the creation of a VMLR database. Thus, it may become necessary for the operating system to pin additional physical memory in order to perform a given I/O operation and to process the I/O requests of such an applications program. In this regard, additional pinned physical memory shall be understood to be generally describing the physical memory that was pinned in step 1102 so the I/O operation can be performed and which is in addition to any physical memory that had been pinned for the applications program prior to the initiation of the I/O request.

In regards to the additional pinned physical memory pages in the case where a VMLR database has been created, such pinning of additional pages typically is done to perform a given I/O operation because other ongoing system demands on the virtual memory corresponding to pinned physical memory make it necessary to increase the amount of pinned physical memory. For example, the pinned physical memory requirements for a given application may be set based on the number of anticipated users accessing the applications program. Thus, if the number of users is increased beyond this the pinned physical memory might prove to be inadequate to cover the I/O operation load on the system.

Following the marking of the I/O Buffer or the pinning of the additional physical memory, the data transfer is processed, Step 1104 (i.e., I/O operation executed). After the marking of the I/O buffer or the pinning of the additional physical memory, the operating system provides the appropriate signals to the computer system hardware (e.g., adapter) so the data/information is transferred to/from the physical memory from/to the storage device, communications or other device as otherwise required by the task being performed. For example, data/information needed to perform an applications program task is written from the bulk storage device, such as a hard disk, to the physical memory addresses corresponding to the virtual memory addresses that are to receive this data. Such an I/O operation also could involve outputting a requested piece of information via a communications device or network device to the requestor via the internet or via an established Ethernet network.

After the data transfer is processed the I/O buffer is unmarked or the additional pinned physical memory is un-pinned, Step 1106. If the I/O buffer had been marked in Step 1102, the I/O Buffer is later unmarked so the virtual memory addresses are again available to receive data therein or transmit data therefrom. If the additional physical memory was pinned so a given I/O operation could be performed in Step 1102, then such additional pinned memory is released so it can be mapped or assigned to another applications program that is running on or being loaded onto the computer system. As indicated above, additional physical memory may be required to perform a given I/O operation and thus may not be required to otherwise allow the applications program to continue to perform as intended. A technique for such un-pinning and un-marking is described herein.

Alternatively, and as described elsewhere herein, the VMLR database is updated to include the virtual memory addresses for the additional pinned physical memory. Such a provision allows for the dynamic adjustment of the pinned physical memory and the corresponding virtual addresses to react to changes in operational conditions, to minimize lost time associated with such pinning an un-pinning of the physical memory and to generally optimize performance of the multi-processor computer system.

This completes the I/O operation for the applications program, Step 1108. At the same time control also is returned to the initiator so that the applications program or process involved with the just completed I/O operation can proceed with and/or be available to perform the next task.

It should be recognized that in the above-described method for performing an I/O operation, the process is generally conducted on a per applications program basis. That is, access and update of the VMLR database as well as the process of marking an I/O buffer is done at the applications program or processor level and not at a system level. Thus, and in contrast to conventional techniques, an I/O operation for one applications program running on the computer system can be performed without generally interfering with the I/O operation already in progress for another running applications program. In other words except for contention for the communications bus over which the data/information is transferred to/from physical memory from/to the storage/communications device(s), the I/O operations for two or more concurrently running applications programs should not generally interfere with each other if the virtual memory addresses for the I/O operations are verified as corresponding to pinned physical memory addresses in accordance with the foregoing. Furthermore, the above-described method can be employed for arbitrary sets of processors and/or arbitrary ranges of memory per application further reducing contention.

Figure 2C:
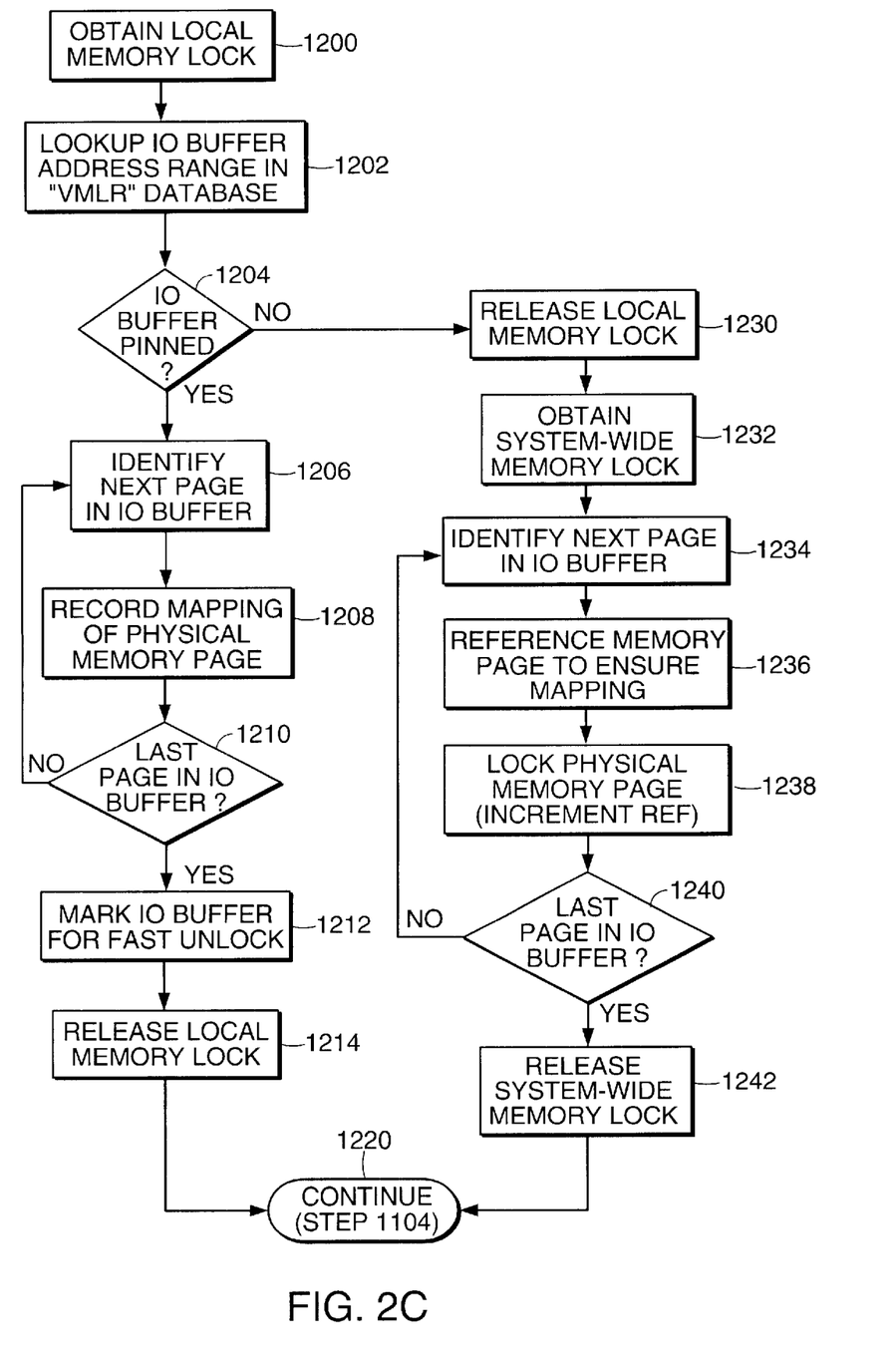
FIG. 2C is a flow diagram of a process for marking the buffer or pinning physical memory pages according to the present invention.

Now referring to FIG. 2C there is shown a flow diagram illustrating a process for marking the buffer/pinning physical memory pages (see step 1102, FIG. 2B). Once an I/O operation is initiated by an applications program, the operating system obtains a local memory lock for the VMLR database, Step 1200. The local lock on the VMLR database is limited to the applications program, process or arbitrary group of processors and/or memory ranges within the applications program or process that had initiated the I/O operation so that other or subsequent I/O operations for other applications programs, processes or arbitrary group of processors and/or memory ranges within the applications program or process running on the computer system are not interfered with, where interference usually consists of delays and wasted CPU cycles caused by contention for system wide global PFD locks, by the in progress initiated I/O operation. The term local or non-global is used herein to generally distinguish those conventional I/O techniques in which a system wide global PFD lock is obtained which prevents other or subsequent I/O operations or processes from being acted upon while the in progress I/O operation is "pinning" or "un-pinning" physical memory (e.g., see steps 102, 106, FIG. 1A).

After obtaining the local memory lock, the I/O buffer address range or the virtual memory addresses or address range for the I/O buffer are looked up in the VMLR database to determine if the I/O buffer address range is for the virtual memory address(es) or range(s) that correspond to already pinned physical memory, (i.e., physical memory pinned before the initiation of the I/O operation), Steps 1202, 1204. As indicated above, the VMLR database identifies the virtual memory addresses or ranges that correspond to physical memory that is already pinned. If the virtual memory addresses for the I/O buffer are determined to correspond to those virtual memory addresses for pinned physical memory (YES, Step 1204) then the process proceeds to the identification of the virtual memory (VM) page in the I/O buffer, Step 1206. After identifying the VM page in the I/O buffer the mapping of the physical memory page that corresponds to the VM page in the buffer is recorded, Step 1208. The recorded mapping of each physical memory page making up the I/O buffer is later used to identify the physical memory pages the data/information is to transferred to/from.

After recording the mapping for the identified VM page, a determination is made as to whether the identified VM page is the last page in the I/O buffer, Step 1210. If this is the last page in the I/O buffer (YES, Step 1212), then a bit, register or other mechanism is set so as to mark the I/O buffer for a fast unlock, Step 1212. The unlocking being referred to is that which occurs after data transfer to/from physical memory as described hereinafter. This marking of the I/O buffer also is an indication that the virtual memory pages in the I/O buffer correspond to virtual memory ranges or addresses in the VMLR database and thus further corresponds to pinned physical memory.

Following marking of the I/O buffer, the local memory lock on the VMLR database is released, Step 1214. Thereafter the process continues, Step 1220, with the processing of the I/O data transfer, Step 1104 (FIG. 2B).

In this way the operating system, which generally performs the VMLR database comparison described herein, can speedily and accurately determine whether or not the expensive process of individually ensuring each physical memory page in the VM address range is suitably locked or pinned prior to and for the I/O operation, the in-progress I/O operation. Because this VMLR database comparison is based on the virtual memory address range, it significantly reduces the overhead due to the contiguous nature of the virtual memory. It also avoids virtual memory to physical memory translation operations. In addition, it at least reduces if not eliminates in many respects the delays and wasted CPU cycles caused by the contention of system wide global PFD locks exhibited by conventional I/O operations. Further, if all of the address ranges participating in the in-progress I/O operation are already pinned, the operating system provides an indicia (e.g., marking of the I/O buffer) to indicate that the unlocking or un-pinning of physical memory, post I/O data transfer, is not required. This eliminates or significantly reduces the overhead following the I/O data transfer as compared with conventional I/O operations.

If the virtual memory addresses for the I/O buffer are determined not to correspond to those virtual memory addresses for pinned physical memory (NO, Step 1204) then the local memory lock on the VMLR database is released and the operating system obtains the system wide global PFD lock, Steps 1230, 1232. Because the virtual memory addresses or pages of the I/O buffer do not thus correspond to pinned physical memory pages, as provided above the PFD must be updated prior to processing of the I/O data transfer so these virtual memory pages all correspond to pinned memory pages. As discussed above, the applications program and operating system preferably pin a sufficient amount of physical memory so as to satisfy the anticipated needs of the applications program, however, it is possible that when a given I/O operation is initiated, the pinned physical memory can be inadequate and thus additional physical memory would have to be pinned to satisfy the increased needs of the applications program. As also indicated above, in an embodiment of the present invention the operating system also is capable of processing an I/O operation request for an applications program or process that was loaded without the concurrent creation of a VMLR database, in which case there would be a need to map virtual and physical memory pages and to pin and unpin physical memory pages as part of the I/O operation.

The illustrated process for pinning the physical memory pages is essentially the same as described above in connection with FIG. 1B, namely the next page in the I/O buffer is identified, Step 1234; after identifying the next page the operating system references the physical memory page and the virtual memory page so as to ensure mapping, Step 1236; and the PFD is updated so as to lock the mapped physical memory page, Step 1238. After locking out or pinning the mapped physical memory page, it is next determined if the identified VM page is the last page in the I/O buffer, Step 1240. If this is not the last VM page in the I/O buffer (NO, Step 1240), then steps 1234–1240 are repeated again and again as needed. If it is determined that the identified VM page is the last page in the I/O buffer (NO, Step 1240) then the system wide global PFD lock on the PFD is released, Step 1242. Thereafter the process continues, Step 1220, with the processing of the I/O data transfer, Step 1104 (FIG. 2B). In this case because a system wide global PFD lock is obtained, the mapping, unmapping or locking functions for the next I/O operation or process is held until the mapping, unmapping or locking functions of the I/O operation in progress is complete. Reference also should be made to the discussion regarding steps 200–210 of FIG. 1B for further details regarding individual process steps 1230–1242.

From the discussion regarding FIG. 2C it is seen that in the case where the I/O buffer VM pages correspond to already pinned physical memory pages, the I/O buffer is marked and when such a correspondence is not present the PFD is updated to pin the pages of physical memory required so that the virtual memory requirements of a given I/O operation can be satisfied. Now referring to FIG. 2D, there is shown a flow diagram of the process for the step of unmarking the buffer or un-pinning physical memory pages illustrated in FIG. 2B, which process first determines if the I/O buffer is marked for a fast unlock, Step 1300.

Figure 2D:
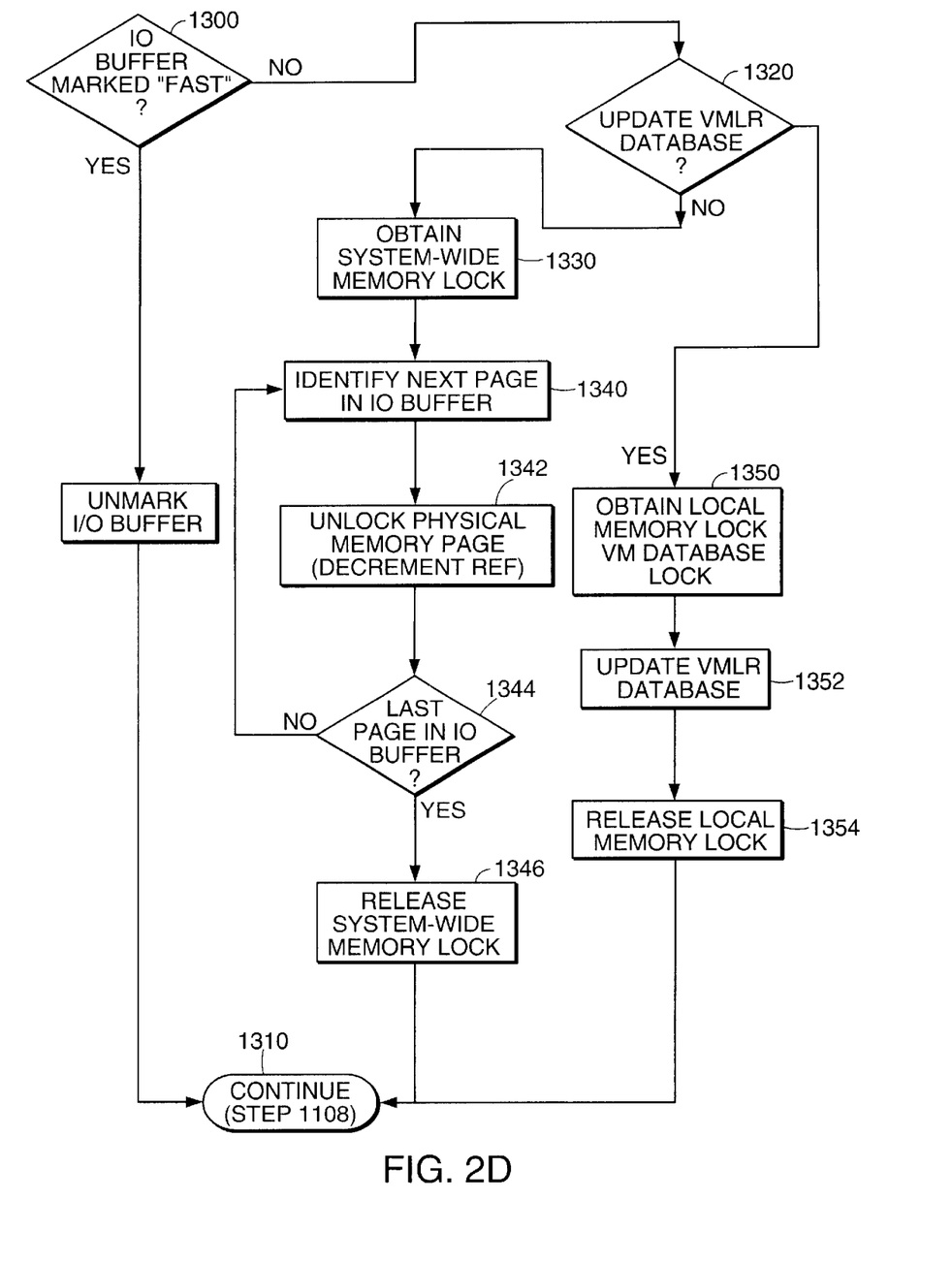
FIG. 2D is a flow diagram of a process for unmarking the buffer or un-pinning physical memory pages according to the present invention.

If the I/O buffer is so-marked (YES, Step 1300), then the fast marking of the I/O buffer is removed, (i.e., buffer is un-marked) Step 1302. Thereafter the process continues, Step 1310, and the system is now available to perform another I/O operation for the applications program associated with the I/O operation that was in progress, Step 1108 (FIG. 2B). As indicated above, there is no impediment on the initiation of an I/O operation by another applications program during the pendency of the in progress I/O operation.

As indicated above, not every I/O operation to be performed involves a case where the VM pages of the I/O buffer correspond to already pinned physical memory pages. In such cases, the corresponding unpinned physical memory pages or the additional physical memory pages are pinned to perform the I/O data transfer as described herein. Thus, if the I/O buffer is not marked for a fast unlock (NO, Step 1300), then at least the additional pinned physical memory used to perform the I/O operation is unpinned following the I/O data transfer.

To un-pin these additional physical memory pages, the operating system obtains a system wide global PFD lock of the PFD, Step 1330. Because the virtual memory addresses or pages of the I/O buffer do not thus correspond to pinned physical memory pages, as provided above the PFD must be updated following the processing of the data transfer so as to release at least the additional pinned physical memory pages so they can be allocated or assigned elsewhere.

The illustrated process for un-pinning the additional physical memory pages is essentially the same as described above in connection with FIG. 1C, namely the next page in the I/O buffer is identified, Step 1340 and after identifying the next page the PFD is updated so as to un-lock the mapped physical memory page, Step 1342. After un-locking or unpinning the mapped physical memory page, it is next determined if the identified VM page is the last page in the I/O buffer, Step 1344. If this is not the last VM page in the I/O buffer (NO, Step 1344), then steps 1340–1346 are repeated again and again as needed. If it is determined that the identified VM page is the last page in the I/O buffer (NO, Step 1344) then the system wide global PFD lock on the PFD is released, Step 1346. Thereafter the process continues, Step 1310, and the in progress or existing I/O operation is complete, Step 1108 (FIG. 2B). The release of the system wide global PFD lock also allows any other memory mapping, unmapping or locking/pinning functions for other I/O operations to attempt to proceed. Reference also should be made to the discussion regarding steps 250–258 of FIG. 1C for further details regarding individual process steps 1330, 1340–1346.

As indicated above, following an I/O data transfer the additional pinned physical memory is unpinned, however, there can arise a need or desire for any of a number of reasons to dynamically adjust the VMLR database and to thereby increase or decrease the virtual memory addresses or ranges that correspond to pinned physical memory pages. As such, and as more particularly illustrated in FIG. 2D, the method of the present invention can further include a process and criteria for such dynamic adjustment of the VMLR database. Thus, following the I/O data transfer the process includes criteria for determining if the VMLR database should be updated for the applications program that had initiated the I/O operation, Step 1320. For example, the number of times additional physical pinned memory was required and/or the amount of additional pinned physical memory required each time could be tracked. If the established criterion for updating the VMLR database is not satisfied (NO, Step 1320), then the process proceeds as described above (see steps 1330, 1340–1346) to un-map and un-pin or unlock the additional physical memory pages. If the established criterion is satisfied (YES, Step 1320), then the VMLR database is updated so as to change the amount of previously pinned physical memory pages and increase the number of corresponding VM pages thereby reducing or eliminating the need for the pinning of additional physical memory pages for an I/O operation. The VMLR database and amount of physical memory also can be adjusted so as to decrease the amount of pinned physical memory.

When the criterion is met, the local memory lock is obtained over the VMLR database, Step 1350. The VMLR database is then updated so as to identify the additional virtual memory ranges or addresses corresponding to the additional physical memory pages, step 1352. After completing the updating process, the local memory lock is released, Step 1354. Thus, in further I/O operations steps 1202, 1204 of FIG. 2C are conducted using the updated VMLR database. Thereafter the process continues, Step 1310, and the I/O operation is complete for the applications program associated with the I/O operation that was in progress, Step 1108 (FIG. 2B).

As also noted above, it is within the scope of the present invention to load a plurality or more applications programs and/or processes onto a multiprocessor computer system where one or more of the loaded programs does not have a VMLR database created therefor or has no virtual memory pages corresponding to pinned physical memory pages for I/O operations. For such a case(s), it is within the scope of the present invention to create an VMLR database in the case where changed circumstances would warrant a change to the manner in which future I/O operations are to be processed by the operating system for such an application. Accordingly, the updating process described hereinabove (Steps 1350–1354, FIG. 2D) is adaptable for use in creating/updating a VMLR database to reflect the changed circumstances for such an application program.

Additionally, it is within the scope of the present invention to provide a multi-processor computer system, such as those shown in FIGS. 3–4, having an operating system for execution therein that embodies the methods and techniques of the present invention as described herein. Further, it is within the scope of the present invention to provide a computer-readable medium as well as computer program product embodying such a medium, in which the medium contains program code of an operating system or applications program, for execution in a multi-processor computer system, that embodies the methods and techniques of the present invention as herein described.

Although a preferred embodiment of the invention has been described using specific terms, such description is for illustrative purposes only, and it is to be understood that changes and variations may be made without departing from the spirit or scope of the following claims.

What is claimed is:

1. A method for reducing overhead associated with system input/output (I/O) operations in a computer system having a plurality of processors and a physical memory accessed and used by the plurality of processors, the method comprising the step of:

creating a pinned virtual memory range database in which is stored virtual memory address information corresponding to pinned physical memory for at least one applications program being run on the computer system, before I/O operations begin for the at least one applications program.

2. A method for reducing overhead associated with system input/output (I/O) operations in a computer system having a plurality of processors and a physical memory accessed and used by the plurality of processors, the method comprising the steps of:

pinning a portion of the physical memory corresponding to identified virtual memory addresses of at least one applications program being loaded onto the computer system; and creating a pinned virtual memory range database in which is stored virtual memory address information corresponding to pinned physical memory for said at least one applications program being run on the computer system that includes the identified virtual memory addresses, said creating being performed at either of when each of the at least one applications program is loaded onto the computer system or before an I/O operation for the at least one applications program.

3. The method according to claim 2, further comprising the steps of:

determining, using the pinned virtual memory range database, that the virtual memory address for data/information to be transferred thereto/therefrom corresponds to pinned physical memory; and transferring data/information to/from pinned physical memory, when said determining determines that the virtual memory address corresponds to pinned physical memory.

4. The method according to claim 3 further comprising the steps of:

un-pinning the pinned physical memory of each of the at least one applications program being unloaded from the computer system; and removing the virtual address information corresponding to the pinned physical memory being unpinned.

5. The method according to claim 3, wherein said step of determining is performed by each processor responsive to the initiation of an I/O operation by said each processor.

6. The method according to claim 3, wherein said step of determining includes marking an I/O buffer after determining that that the virtual memory address corresponds to pinned physical memory.

7. The method according to claim 3, wherein said step of determining includes the steps of:

looking-up an I/O buffer address range in the pinned virtual memory range database;

determining if the I/O buffer address range corresponds to a virtual memory address range that is pinned physical memory;

recording the mapping of the physical memory address range that corresponds to the identified virtual memory address range; and marking the I/O buffer.

8. The method according to claim 7, wherein said steps of looking-up, determining if the I/O buffer address range corresponds to a virtual memory address range that is pinned physical memory, recording and marking, is performed by each processor responsive to the initiation of an I/O operation by said each processor.

9. The method according to claim 7, wherein said step of determining further comprises the steps of:

obtaining a local lock of the pinned virtual memory range database prior to said step of looking-up; and releasing the lock on the pinned virtual memory range database following said step of marking the I/O buffer.

10. The method according to claim 7, wherein said method further comprises the step of un-marking the I/O buffer following transfer of the data/information.

11. The method according to claim 7, wherein following a determination that the I/O buffer address range does not corresponds to a virtual memory address range for pinned physical memory, said step of determining includes the steps of:

obtaining a system-wide memory lock;

mapping the physical memory address range corresponding to the virtual memory address range that were not pinned;

pinning the mapped physical memory; and releasing the system-wide memory lock.

12. The method according to claim 11, wherein, following said step of transferring, said method further comprises the step of unpinning the pinned physical memory for the virtual memory address range that had not been pinned when the I/O operation was initiated.

13. The method according to claim 11, wherein, following said step of transferring, said method further comprises the steps of:

determining if the pinned virtual memory range database should be updated to include additional virtual memory addresses that were not been pinned when the I/O operation was initiated;

if it is determined that the pinned virtual memory range database should be updated, then updating the database to include the additional virtual memory addresses; and if it is determined that the pinned virtual memory range database should not be updated, then unpinning the pinned physical memory for the virtual memory address range that had not been pinned when the I/O operation was initiated.

14. A computer program product comprising:

a computer-readable medium bearing program code for an operating system of a multi-processor computer system, the program code including:

a first computer-readable program code segment for causing the computer system to create a pinned virtual memory range database in which is stored virtual memory address information corresponding to pinned physical memory for at least one applications program being run on the computer system, before I/O operations begin for the at least one applications program.

15. A computer program product comprising:

a computer-readable medium bearing program code for an operating system of a multi-processor computer system, the program code including:

a first computer-readable program code segment for causing the computer system to create a pinned virtual memory range database in which is stored virtual memory address information corresponding to pinned physical memory for at least one applications program being run on the computer system; and wherein the first code segment includes instructions and criteria to:

(1a) pin a portion of the physical memory corresponding to identified virtual memory addresses of each of the at least one applications program being loaded onto the computer system and (1b) create the pinned virtual memory range database that includes these virtual memory addresses, where the pinned virtual memory range data base is created at either of when each of the at least one applications program is loaded onto the computer system or before an I/O operation for the at least one applications program.

16. The computer program product of claim 15, wherein the first code segment further includes instructions and criteria to:

(1c) un-pin the pinned physical memory of each of the at least one applications program being unloaded from the computer system and (1d) remove the virtual address information corresponding to the pinned physical memory being unpinned.

17. The computer program product of claim 15, wherein the program code further includes a second computer-readable program code segment for processing input/output operations of the computer system, wherein the second code segment comprises instructions and criteria to:

(2a) determine, using the pinned virtual memory range database, that the virtual memory address for data/information to be transferred thereto/therefrom corresponds to pinned physical memory and (2b) transfer data/information to/from pinned physical memory, when it is determined that the virtual memory address corresponds to pinned physical memory.

18. The computer program product of claim 17, wherein the second code segment further comprises instructions and criteria that said (2a) is performed by each processor responsive to the initiation of an I/O operation by said each processor.

19. The computer program product of claim 17, wherein said (2a) of the second code segment further comprises instructions and criteria to:

(2a1) look-up an I/O buffer address range in the pinned virtual memory range database, (2a2) determine if the I/O buffer address range corresponds to a virtual memory address range that is pinned physical memory, (2a3) record the mapping of the physical memory address range that corresponds to the identified virtual memory address range, and (2a4) marking the I/O buffer.

20. The computer program product of claim 19, wherein the second code segment further comprises instructions and criteria that said (2a1)–(2a4) are performed by each processor responsive to the initiation of an I/O operation by said each processor.

21. The computer program product of claim 17 wherein the second code segment further includes instructions and criteria to:

(2c) mark an I/O buffer after determining that that the virtual memory address corresponds to pinned physical memory, and (2d) un-mark the I/O buffer following transfer of the data/information.

22. The computer program product of claim 17 further including a third computer-readable code segment for processing an I/O operation when it is determined by the second code segment that the I/O buffer address range does not correspond to a virtual memory address range for pinned physical memory, wherein the third code segment comprises instructions and criteria to:

(3a) pin additional physical memory pages, including:

(3a1) obtaining a system-wide memory lock, (3a2) mapping the physical memory address range corresponding to the virtual memory address range that were not pinned, (3a3) pinning the mapped physical memory, and (3a4) releasing the system-wide memory lock; and (3b) unpin the additional physical memory pages following transfer of the data/ information, including:

(3b1) obtaining a system-wide memory lock, (3b2) un-pin each of the additional physical memory pages, and (3b3) releasing the system-wide memory lock.

23. The computer program product of claim 22 further including a fourth computer-readable code segment for determining if the pinned virtual memory range database should be updated to include additional virtual memory addresses that were not been pinned when the I/O operation was initiated, the fourth code segment including instructions and criteria to:

(4a) update the database to include the additional virtual memory addresses, if it is determined that the pinned virtual memory range database should be updated, and (4b) perform said (3b) if it is determined that the pinned virtual memory range database should not be updated.

24. A multiprocessor computer system comprising:
a plurality of processors;
a physical memory accessed and used by the plurality of processors;
program code for execution within the plurality of processors; and
wherein the program code comprises criteria and a sequence of instructions to create a pinned virtual memory range database in which is stored virtual memory address information corresponding to pinned physical memory for at least one applications program being run on the computer system, before I/O operations begin for the at least one applications program.

25. A multiprocessor computer system comprising:
a plurality of processors;
a physical memory accessed and used by the plurality of processors;
program code for execution within the plurality of processors; and
wherein the program code comprises criteria and a sequence of instructions to:
create a pinned virtual memory range database in which is stored virtual memory address information corresponding to pinned physical memory for at least one applications program being run on the computer system,
pin a portion of the physical memory corresponding to identified virtual memory addresses of each of the at least one applications program being loaded onto the computer system, and
wherein the criteria and sequence of instructions to create a pinned virtual memory range database includes creating the pinned virtual memory range database that includes the identified virtual memory addresses, and wherein the pinned virtual memory range data base is created at either of when each of the at least one applications program is loaded onto the computer system or before an I/O operation for the at least one applications program.

26. The multiprocessor computer system of claim 25, wherein the program code further includes criteria and a sequence of instructions to process input/output (I/O) operations of the computer system; the criteria and sequence of instructions for processing I/O operations including:

determining, using the pinned virtual memory range database, that the virtual memory address for data/information to be transferred thereto/therefrom corresponds to pinned physical memory, and transferring data/information to/from pinned physical memory, when said determining determines that the virtual memory address corresponds to pinned physical memory.

27. The multiprocessor computer system of claim 26, wherein the criteria and sequence of instructions for processing I/O operations further comprises having said determining that the virtual memory address for data/information to be transferred thereto/therefrom corresponds to pinned physical memory performed by each processor responsive to the initiation of an I/O operation by said each processor.

* * * * *